(12) United States Patent
Hasegawa

(10) Patent No.: US 7,468,858 B2
(45) Date of Patent: Dec. 23, 2008

(54) INFORMATION RECORDING APPARATUS

(75) Inventor: Shinya Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/598,711

(22) Filed: Nov. 14, 2006

(65) Prior Publication Data

US 2008/0002281 A1    Jan. 3, 2008

(30) Foreign Application Priority Data

Jun. 29, 2006   (JP)   ............................. 2006-180111

(51) Int. Cl.
*G11B 5/596* (2006.01)
(52) U.S. Cl. .................................. 360/78.11
(58) Field of Classification Search ........................ None
See application file for complete search history.

(56) References Cited

U.S. PATENT DOCUMENTS

| | | | | |
|---|---|---|---|---|
| 5,179,482 A * | 1/1993 | Tanaka et al. | ............. | 360/97.01 |
| 5,199,090 A * | 3/1993 | Bell | ............................ | 385/33 |
| 5,408,375 A | 4/1995 | Asano | ......................... | 360/105 |
| 5,422,872 A | 6/1995 | Hsu et al. | ....................... | 369/97 |
| 5,889,641 A * | 3/1999 | Belser et al. | ................. | 360/313 |
| 5,986,978 A * | 11/1999 | Rottmayer et al. | ........ | 369/13.17 |
| 6,055,222 A | 4/2000 | Knight | ........................ | 369/112 |
| 6,122,132 A * | 9/2000 | Larsen | ...................... | 360/77.03 |
| 6,301,797 B1 * | 10/2001 | Sundaram et al. | .............. | 33/645 |
| 6,477,118 B1 * | 11/2002 | Awano et al. | ............. | 369/13.14 |
| 6,868,048 B1 * | 3/2005 | McDaniel et al. | ......... | 369/13.06 |
| 6,924,958 B2 * | 8/2005 | Vigna et al. | ............... | 360/77.03 |
| 2001/0007547 A1 | 7/2001 | Takishima et al. | | |
| 2001/0021165 A1 | 9/2001 | Nakagishi | | |
| 2002/0074875 A1 | 6/2002 | Nakagishi | | |
| 2002/0167870 A1 | 11/2002 | Akiyama et al. | | |
| 2005/0146992 A1 * | 7/2005 | Inomata et al. | ........... | 369/13.02 |

FOREIGN PATENT DOCUMENTS

JP    6-131738    5/1994
JP    2001-34982    2/2001

OTHER PUBLICATIONS

European Search Report dated Dec. 28, 2007.

\* cited by examiner

*Primary Examiner*—K. Wong
(74) *Attorney, Agent, or Firm*—Kratz Quintos & Hanson, LLP

(57) ABSTRACT

An information recording apparatus comprises a recording medium, a swing arm driven by an actuation unit, the swing arm swinging over a surface of the medium in response to driving by the actuation unit, a recording head carried by the swing arm and scanning over the surface of the medium with a swinging motion of the swing arm by the actuation unit, the recording head recording information to the medium, a head retracting mechanism retracting the recording head out of the medium in a state where no recording is to be made on the medium, an optical injection unit injecting a light into the recording head, the recording head including an optical irradiation part irradiating the light injected to the recording head upon the medium when recording information to the medium. The optical injection unit is integrated with the head retracting mechanism to form a unitary optical-injection and head-retraction mechanism.

11 Claims, 14 Drawing Sheets

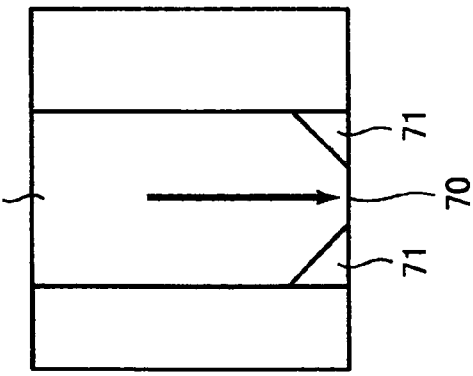
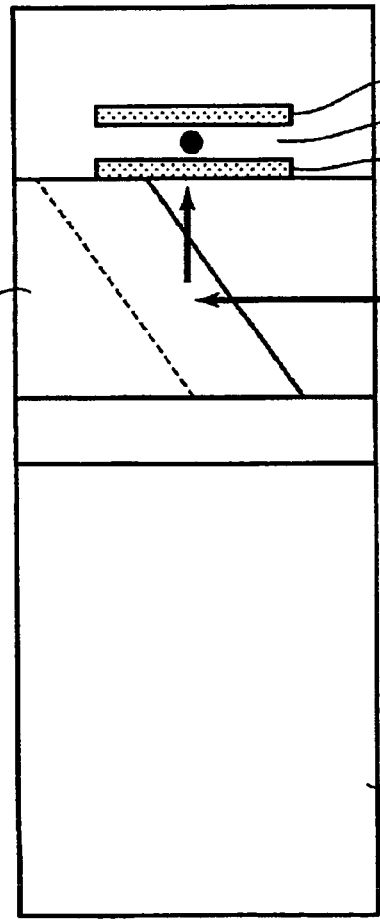
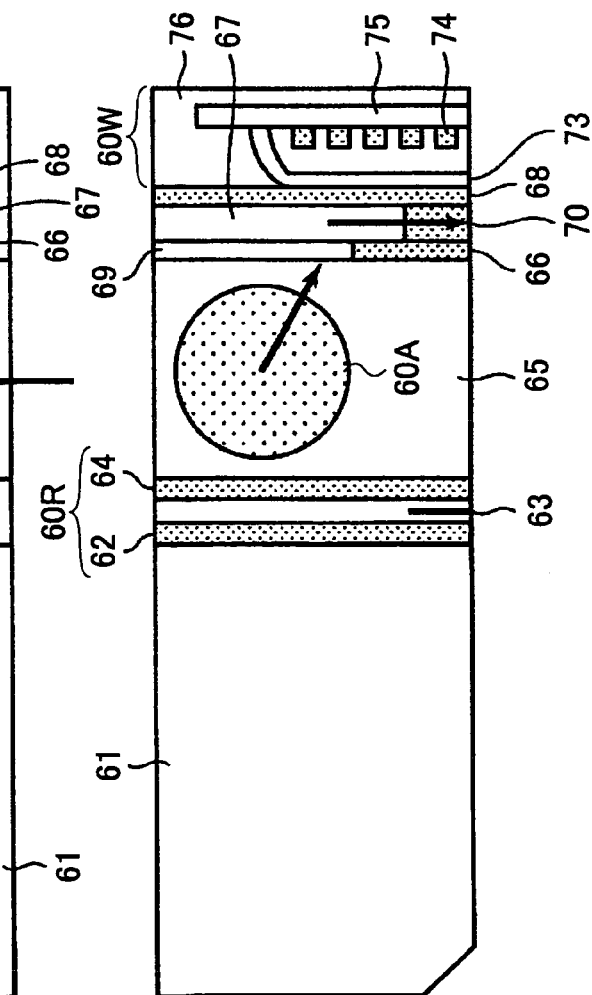

INFORMATION RECORDING APPARATUS

CROSS-REFERENCE TO RELATED APPLICATION

The present application is based on Japanese priority application No. 2006-180111 filed on Jun. 29, 2006, the entire contents of which are hereby incorporated by reference.

BACKGROUND OF THE INVENTION

The present invention generally relates to information recording apparatuses and more particularly to an information recording apparatus having a compact size and yet capable of recording and reproducing information to and from a recording medium with high recording density and high speed and at the same time capable of solving the problem of heat fluctuation occurring in high-density recording medium by using a heat assist technology.

Recently, recording density is increasing in recording media used for information recording. Typical example would be a magnetic disk recording medium of a magnetic disk apparatus, which is used extensively in computers and computer-related apparatuses. In a magnetic disk apparatus, increase of storage capacity is caused mainly as a result of increase of recording density of the magnetic disk.

SUMMARY OF THE INVENTION

In magnetic disk apparatuses, writing and reading of information is conducted to and from a magnetic disk used for the recording medium by a magnetic head. Thus, the construction of a magnetic disk apparatus according to a related art of the present invention will be reviewed with reference to FIGS. 7 and 8 showing a magnetic disk apparatus 40 according to a related art of the present invention.

Referring to FIG. 7 showing the magnetic disk apparatus 40 in a plan view, the magnetic disk apparatus 40 includes a magnetic disk 42 fixed upon and rotated by a spindle motor 41 and a slider 50 carrying a magnetic head 50H thereon, wherein the slider 50 scans over the surface of the rotating magnetic disk 42 together with the magnetic head 50H thereon by being driven by a swing arm 43 referred to also as "head suspension". The swing arm 43 is driven by an electromagnetic actuator 44.

In the illustrated example, writing and reading of information is conducted to and from the rotating magnetic disk 42 by a writing head and a reading head respectively constituting the magnetic head 50H as the swing arm 43 cause a swinging motion by the driving operation of the electromagnetic actuator 44. Because the swing arm 43 is formed to have a compact size and has a light weight (small inertia), the magnetic disk apparatus of FIG. 7 can achieve the seek operation and read/write operation at high speed.

FIG. 8 shows the construction of the slider 50 of the related art shown in FIG. 7, wherein FIG. 8 is an oblique cross-sectional view diagram of the slider 50 along a cross-section taken at the central part of a primary magnetic pole 57 constituting a "monopole perpendicular recording head" used in the magnetic head 50H. It should be noted that the cross section of FIG. 8 is taken along a longer axis of the primary magnetic pole 57.

Referring to FIG. 8, the slider 50 includes an AlTiC substrate 51 having a size of about 1 mm for each edge wherein the AlTiC substrate 51 constitutes the major part of the slider 50.

On the substrate 51, there is provided a reading head in the form of consecutive lamination of a lower magnetic shielding layer 52, a magnetoresistive element 53 and an upper magnetic shielding layer 54, and the writing head of the monopole type is provided further thereon, wherein the writing head includes an auxiliary magnetic pole 55, a write coil pattern 56 formed on the auxiliary magnetic pole 55 and the primary magnetic pole 57 provided over the write coil pattern 56. Further, there is provided a projection called "pad" on the AlTiC substrate 51 in correspondence to an air bearing surface (ABS) facing the surface of the recording medium 42.

It should be noted that each part of the magnetic head is formed by a thin film process that includes lithography process, wherein any of MR element, GMR element, TMR element, or the like, can be used for the magnetoresistive element 53.

Further, it should be noted that the auxiliary magnetic pole 55 of the writing head functions to absorb the magnetic flux exited from the primary magnetic pole 57 and passed through a recording layer on the magnetic disk 42 as the magnetic flux thus passed through the recording layer returns to the writing head through a backing layer provided on a magnetic disk 42. Thereby, it should be noted that the primary magnetic pole 57 has a sharply pointed tip end for concentrating the magnetic field such that the concentrated magnetic field forms a recording magnetic field of sufficient magnitude.

It should be noted that the writing head of this type is called monopole type head in view of the fact that the primary magnetic pole 57 forms a substantially isolated pole (monopole) of N or S at the time of writing operation of information to the recording medium. Thus, with the magnetic head 50H of FIG. 8, writing of information is made to the recording layer of the magnetic disk 42 by generating a magnetic field from the primary magnetic pole 57.

Conventionally, a magnetic material such as CoPt has been used for the recording layer of the magnetic disk 42, while the recording layer is not limited to CoPt but other thin film of hard magnetic metal such as TeFeCo, or the like, can also be used. In the case the magnetic disk 42 is a magnetic disk for perpendicular recording, a soft magnetic film such as a Permalloy is provided as the backing layer, and the foregoing recording layer is formed on such a backing layer.

When the surface recording density is increased with such a magnetic disk apparatus for increasing the storage capacity per unit area of the magnetic disk, the size for one bit information (bit size) on the magnetic disk is decreased inevitably, while such miniaturization of bit size tends to invite the problem of thermal demagnetization.

In more detail, it is necessary to decrease the size of the magnetic particles of the recording layer when the bit size is to be reduced for increasing the recording density, while there is a need of maintaining a parameter Ku×V to be 60 times or more of the thermal energy kT in order to avoid the foregoing problem of thermal demagnetization at the temperature T, wherein V stands for the volume of the magnetic particle, Ku stands for the anisotropic constant and k stands for the Boltzmann's constant.

Thus, in order to maintain the ratio of Ku×V to kT to be 60 or more while using a small volume V for the magnetic particles, it is necessary to increase the value of the anisotropic constant Ku of the magnetic material used for the recording layer, while the use of the magnetic material having such a large anisotropic constant Ku necessitates the use of large magnetic field at the time of writing information to the magnetic recording layer. However, it is difficult to realize a recording magnetic head that can produce such a large recording magnetic field. Thus, there has been a difficulty of increasing the storage capacity of magnetic disk even in the case the magnetic disk is the one designed for perpendicular recording.

In view of the foregoing situation, there is proposed a thermal assist technology in such a high-density magnetic recording process, wherein the thermal assist technology uses a process of lowering the coercive force of the recording layer of the magnetic disk temporarily at the time of writing information to the magnetic disk by heating the magnetic disk by way of irradiation of light, such that writing becomes possible with ordinary recording magnetic field.

More specifically, with the thermal assist technology, the recording layer of high Ku, and hence of high coercive force, of the recording medium is heated locally and temporarily in the region where the writing is to be made by irradiating an optical beam such that the coercive force of the heated region is lowered below the writing magnetic field produced by the writing head.

For implementing such a thermal assist technology, there is proposed an optical system that includes mirrors, lenses, and the like, wherein the optical system is designed for mounting upon the swing arm of the magnetic disk apparatus. With such a construction, writing of information is achieved on the magnetic disk 42 by using a magnetic field generated by the coil pattern of the writing head while directing a laser beam produced a laser diode, or the like, to the region of the magnetic disk where the information is to be written as auxiliary writing means. Reference should be made to Patent Reference 1, which describes the technology of MO (magneto-optic) disk.

Further, there is proposed a construction for implementing the thermal assist technology wherein an optical system is mounted upon a swing arm together with a laser diode (Patent Reference 2). Further, there is proposed a construction that directs a laser beam to the recording medium by way of an optical fiber (reference should be made to Patent Reference 3).

Further, there is proposed a technology of magneto-optical disk that conducts magnetic recording on a recording medium while irradiating laser beam upon the recording medium by using a linear actuator. Reference should be made to Patent Reference 4.

Patent Reference 1
  Japanese Laid-Open Patent Application 11-142777
Patent Reference 2
  Japanese Laid-Open Patent Application 2001-034982
Patent Reference 3
  Japanese Laid-Open Patent Application 2002-298302
Patent Reference 4
  Japanese Laid-Open Patent Application 6-131738

SUMMARY OF THE INVENTION

With the thermal assist technology of conventional art noted before, it should be noted that an optical system or optical fiber is mounted upon the swing arm for conducting the thermal assisting process. With such a construction, however, there has been a problem in that the inertia of the swing arm is increased as a result of carrying the extraneous load. Thereby, there arises a problem that high-speed seek operation or high-speed read/write operation, which is pertinent to magnetic disk apparatuses, becomes difficult.

Further, while it may be conceivable to use a linear actuator used in optical disk apparatuses in magnetic disk apparatuses in place of the swing arm, it is extremely difficult to newly design a linear actuator suitable for a magnetic disk apparatus, and such an approach is deemed not realistic in view of the time and cost for designing the actuating system. Further, even when such a linear actuator is designed, it is expected that there would arise the problem of very slow access speed, and the high-speed access performance pertinent to a magnetic disk apparatus would be lost.

Thus, it is an important issue in the technology of high-density magnetic disk apparatuses to solve the problem of thermal demagnetization by using the thermal assist technology while not diminishing the advantage pertinent to the magnetic disk apparatuses such as high access speed and high speed read/write operation.

In view of the forgoing problems, and in order to realize ultra high-density recording by using thermal assist technology without modifying the currently used construction of magnetic disk apparatuses significantly, the inventor of the present invention has proposed, in a related art of the present invention, an approach of injecting a laser beam to a slider scanning over a surface of the magnetic disk from outside such that the laser beam is injected in a direction perpendicular to a lateral surface of the slider.

According to this proposal, a minute optical beam is produced by passing a laser beam of a laser diode through a lens capable of generating desired spherical aberration and the minute optical beam thus produced with spherical aberration is irradiated upon the magnetic disk uniformly through the slider.

Hereinafter, the magnetic disk apparatus of this related art will be explained with reference to FIGS. 9-11, wherein those parts corresponding to the parts described previously are designated by the same reference numerals and the description thereof will be omitted.

FIG. 9 shows a magnetic disk apparatus 40A according to the foregoing related art in a schematic plan view, Referring to FIG. 9, the magnetic disk apparatus 40A uses a slider 60 for carrying the magnetic head in place of the slider 50 of the magnetic disk apparatus of FIG. 7, wherein the slider 60 includes an optical irradiation member that irradiates the surface of the magnetic disk 42 with the laser beam. Further, with the magnetic disk apparatus 40A of FIG. 9, there is provided an optical system that injects a laser beam to the slider 60 from outside at a lateral surface thereof in the direction perpendicular to the lateral surface of the slider 60.

It should be noted that this optical system is provided at a location where an air filter has been provided in a magnetic disk apparatus of conventional construction and is formed of a laser diode 81, a focusing lens 82, an MEMS (micro electromechanical system) mirror 83, a cylindrical lens 84, a mirror 85 and a spherical aberration lens 86. Here, it should be noted that the MEMS mirror 83 is provided for the purpose of switching the optical path of the laser beam in correspondence to plural swing arms provided with plural number in the case the magnetic disk apparatus includes plural magnetic disks 42 stacked on the common spindle motor 41.

Referring to FIG. 9, the laser beam emitted from the laser diode 81 is focused upon a mirror surface of the MEMS mirror 83 by the focusing lens 82 and the laser beam reflected by the mirror surface of the MEMS mirror 83 is changed to a parallel beam with regard to one direction perpendicular to the plane of sheet of the drawing as it passes through the cylindrical lens 84. The laser beam thus conditioned is directed to the mirror 85 for reflection, wherein the laser beam reflected by the mirror 85 is then directed to an optical beam inlet port 60A (FIG. 10, FIG. 11B) provided on the lateral surface of the slider 60 after passing through the spherical aberration lens 86. With this, the miniature optical beam is irradiated upon the magnetic disk 42 uniformly through the slider 60 and through the optical irradiation member held on the slider 60.

FIG. 10 is the diagram explaining the situation of irradiating the laser beam upon the lateral surface of the slider 60 noted above.

Referring to FIG. 10, it can be seen that the spherical aberration lens 86 causes diffusion of the laser beam in different directions, and thus, it becomes possible to direct a ray in the laser beam to the optical inlet port 60A at the lateral surface of the slider 60 at any rotating angle of the swing art 43.

In the illustrated example, the distance from the center of rotation of the swing arm 43 to the optical inlet port 60A on the slider 60 is set to 32 mm and the slider 60 is designed to swing over the area of the magnetic disk 42 between the radial distance of 17 mm to the radial distance of 30 mm as measured from the center of rotation of the magnetic disk 42. The magnetic disk 42 has a radius of 35 mm.

While various angles are conceivable for the angle of directing the minute optical beam to the slider 60, the foregoing design of directing the optical beam perpendicularly to the lateral surface of the slider 60 is thought advantageous in view of the available space inside the magnetic disk apparatus, easiness of designing of the optical system, easiness of manufacturing the slider 60, and the like.

FIGS. 11A-11C are diagrams explaining the magnetic head formed on the slider 60 and used with the magnetic disk apparatus of the foregoing related art of FIG. 9, wherein FIG. 11A shows the slider 60 in a plan view, FIG. 11B shows the slider 60 in a side view, while FIG. 11C shows the slider 60 in an end view. Similarly to the magnetic heads used in ordinary magnetic disk apparatuses, the magnetic head of this related art can be produced with low cost for any of the reading head and the writing head by using a wafer process.

More specifically, a lower shielding layer 62, a magnetoresistive element 63 and an upper magnetic shielding layer 64 are formed consecutively on an end surface of an AlTiC substrate 61 constituting a major part of the slider 60 to form a reading head 60R, and a mirror member 65 is bonded thereupon for reflecting the laser beam used for the thermal assist process, wherein the mirror member 65 is formed by processing a bulk glass body in the form of prism. The mirror member 65 is designed such that the laser beam reflected by the mirror member 65 has a beam diameter of 80 μm.

Next, an optical irradiation member formed of a core layer 67 of $Ta_2O_5$ sandwiched by cladding layers 66 and 68 of $SiO_2$ is provided on the mirror member 65, wherein it should be noted that the optical irradiation member is provided with an optical inlet port 69 by the material forming the core layer 67 in correspondence to a cutout part formed the cladding layer 66, and there are provided a pair of members 71 of $SiO_2$ forming an iris structure defining an optical outlet port 70, and the laser beam is emitted toward the magnetic disk 42 thorough the optical outlet port 70 thus defined by the iris structure. In the illustrated example, the optical output port 70 may have an aperture length of 1 μm.

Further, the optical irradiation member thus formed is covered by an $Al_2O_3$ film not illustrated for planarization, and a writing head including a primary magnetic pole 73, a writing coil pattern 74 and an auxiliary magnetic pole 75 is formed further thereon by an ordinary film forming process. Further, the entire writing head thus formed is covered by an $Al_2O_3$ film 76.

With the construction of FIGS. 11A-11C, it will be noted that the primary magnetic pole 73 is formed at the side closer to the AlTiC substrate 61 with regard to the auxiliary magnetic pole 75 for ensuring the laser beam used for the thermal assist effect is irradiated to the region of the magnetic disk 42 crossed with the magnetic flux exited from the primary magnetic pole 73.

Thus, the magnetic head of FIGS. 11A-11C can be formed by a wafer process similarly to the magnetic heads of conventional magnetic disk apparatuses in the form that the reading head and writing head are integrated with the slider 60, and it becomes possible to suppress the cost of manufacture of the magnetic head.

Further, because the optical system for introducing the laser beam to the lateral surface of the slider 60 is provided by using the location of air filter of conventional magnetic disk apparatuses of the disk size of 3.5 inch, for example, there is no need of substantial modification of current design of the magnetic disk apparatus, and it becomes possible to achieve ultra-high density recording of information by using the thermal assist technology.

On the other hand, with the thermal assist technology of magnetic disk apparatus of the foregoing related art, there has been a problem, when the thermal assist technology is to be applied to a compact magnetic disk apparatus of the disk size of 2.5 inch or less, that the optical irradiation structure causes interference with a ramp structure used in magnetic disk apparatuses of compact size of these days for holding the magnetic head in the state the magnetic disk apparatus is not in read/write operation. Because of this, it has been difficult to reduce the size of the magnetic disk apparatus.

More specifically, in the case of magnetic disk apparatus of the disk diameter of 3.5 inches, the magnetic head is placed in contact with the surface of the magnetic disk in an unload state thereof in which the magnetic disk apparatus does not perform read or write operation. In the case of compact magnetic disk apparatuses that use the disk diameter of 2.5 inches or less, on the other hand, the magnetic head is retracted to the ramp structure in the unload state for avoiding damaging of the magnetic disk caused by the magnetic head, in anticipation of mobile applications where there is a possibility that the magnetic disk apparatus is tend to be subjected to shock.

Further, with the use of such a ramp structure, it becomes possible with the compact magnetic disk apparatus to eliminate the need of providing un-recording region on the surface on the medium surface for resting the magnetic head in the unload state as practiced in the magnetic disk apparatuses of 3.5 inch disk diameter. Thereby, it becomes possible to avoid the problem of decrease of storage capacity of the magnetic disk apparatus caused by formation of such un-recording region.

Hereinafter, the ramp structure will be explained in more detail with reference to FIGS. 12A and 12B, FIG. 13 and FIG. 14.

FIGS. 12A and 12B show the retraction of the head suspension (arm 43) in a compact magnetic disk apparatus respectively for the case of unload state and load state.

Referring to FIGS. 12A and 12B, the suspension 43 is retracted and fixed to a ramp structure 90 in the unload state shown in FIG. 12A. On the other hand, in the load state shown in FIG. 12B, the suspension 43 leaves the ramp structure 90 and performs the scanning operation over the magnetic disk 42 freely similarly to general magnetic disk apparatuses.

FIG. 13 shows the construction of the swing art 43 used in a compact magnetic disk apparatus in an oblique view.

Referring to FIG. 13, the swing arm 43 carries the slider 50 near a tip end part thereof, wherein the swing arm 43 for use in a magnetic disk apparatus of the disk diameter of 2.5 inches or less generally includes a tab 77 on the tip end part such that the tab 77 projects from the tip end part of the swing arm 43.

FIG. 14 shows the state of the swing arm 43 retracted to the ramp structure 90.

Referring to FIG. 14, the ramp structure 90 includes a first holding member 91 and a second holding member 95, wherein the first holding member 94 includes a sloped surface 92, a flat surface 93 and a depression 94. Thus, in each platter, the tab 77 at the tip end part of the head suspension 43 engages with the sloped surface 92 and, after being guided along the flat surface 93, is accepted by the depression 94 when the magnetic disk has changed the state thereof from the load state to the unload state. In the depression 94, the tab 77 is held by the second support member 95.

With the magnetic disk apparatus that uses such a ramp structure 90, there arises a problem in that, when the optical system of the optical irradiation structure of the foregoing related art is to be incorporated into the magnetic disk apparatus for injecting the laser beam perpendicularly to the lateral surface of the slider, the optical system causes interference with the ramp structure 90. Thus, there has been a problem in that it is impossible to provide the optical system of the optical irradiation structure in the magnetic disk apparatus for the purpose of implementing the thermal assist technology.

According to the present invention, there is provided an information recording apparatus comprising:

a recording medium;

a swing arm driven by an actuation unit, said swing arm swinging over a surface of said recording medium in response to driving by said actuation unit;

a recording head carried by said swing arm and scanning over said surface of said recording medium with a swinging motion of said swing arm by said actuation unit, said recording head recording information to said recording medium;

a head retracting mechanism retracting said recording head out of said recording medium in an unload state where no recording is to be made on said recording medium;

an optical injection unit injecting a light into said recording head, said recording head including an optical irradiation part irradiating said light injected to said recording head upon said recording medium when recording information to said recording medium, wherein said optical injection unit is integrated with said head retracting mechanism to form a unitary optical-injection and head-retraction mechanism.

According to the present invention, the space occupied in the information recording apparatus by the optical injection unit and the head retracting mechanism is reduced as a result of integration of the optical injection unit and the retracting mechanism to form the unitary optical injection and head-retraction mechanism. Thereby, it becomes possible to adopt the thermal assist technology also in a compact information recording apparatus that uses the head retracting mechanism, without changing the currently used construction substantially. Thus, with the present invention, it becomes possible to achieve high-density information recording by eliminating the problem of thermal fluctuation and it becomes also possible to achieve high-speed recording of information by high speed seek operation.

Other objects and further features of the present invention will become apparent from the following detailed description when read in conjunction with the attached drawings.

BRIEF DESCRIPTION OF THE DRAWINGS

FIGS. 11A-11C are diagrams explaining the construction of a magnetic head mounted upon a slider in the magnetic disk apparatus of FIG. 9;

DETAILED DESCRIPTION OF THE INVENTION

[Principle]

Figure 1:
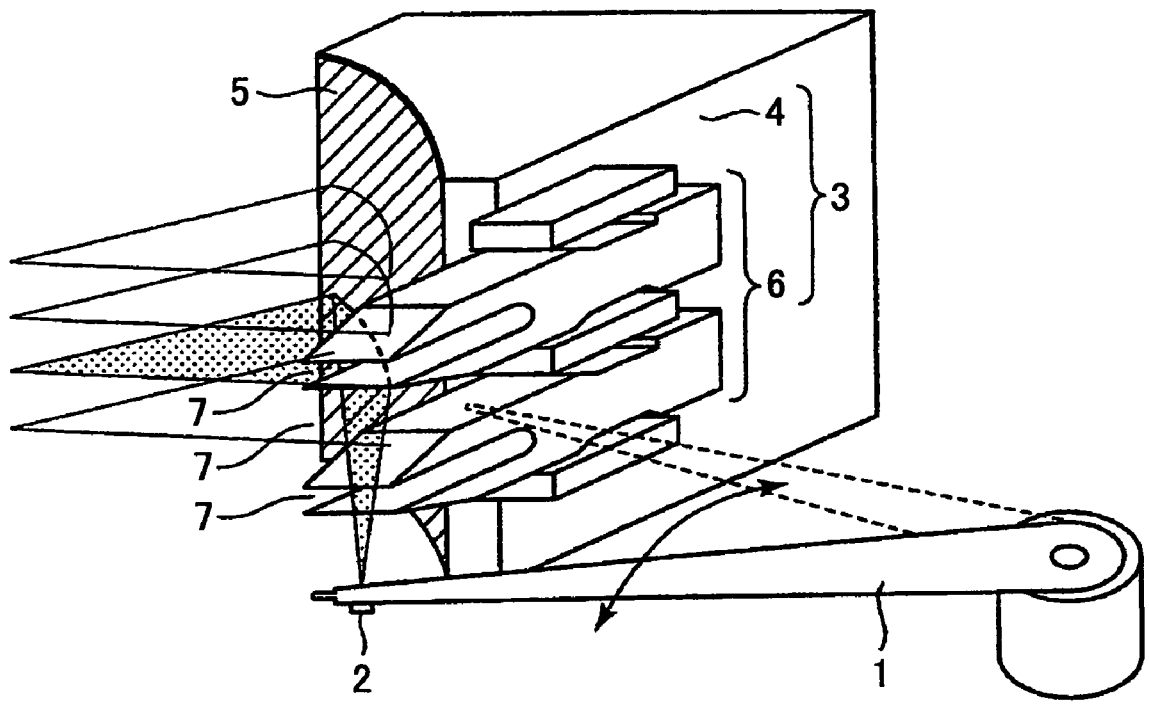
FIG. 1 is a diagram explaining the principle of the present invention.

FIG. 1 shows the principle of the present invention.

Referring to FIG. 1, the present invention provides an information recording apparatus comprising: a recording medium 12 (not shown in FIG. 1, see FIG. 2); a swing arm 1 driven by an actuation unit 15 (not shown in FIG. 1, see FIG. 2), the swing arm 1 swinging over a surface of the recording medium in response to driving by the actuation unit 15; a recording head 2 carried by the swing arm 1 and scanning over the surface of the recording medium with a swinging motion of the swing arm 1 by the actuation unit 15, the recording head 2 recording information to the recording medium 12; a head retracting mechanism 6 retracting the recording head 2 out of the recording medium 12 in an unload state where no recording is to be made on the recording medium 12; an optical injection unit 4 injecting light into the recording head 2, the recording head 2 including an optical irradiation part 65 (not shown in FIG. 1, see FIG. 11B) irradiating the light injected to the recording head 2 upon the recording medium when recording information to the recording medium 12, wherein the optical injection unit 4 is integrated with the head retracting mechanism 6 to form a unitary optical-injection and head-retraction mechanism 3.

By integrating the optical injection unit 4 and the head retracting mechanism 6, the problem of interference of the retracting mechanism 6 and the optical injection unit 4 is eliminated, and it becomes possible to save the space inside the information recording apparatus. Thereby, it becomes possible to use the thermal assist technology in the information recording apparatus that uses the retracting mechanism 6 without changing the current construction of the magnetic disk apparatus significantly.

While the recording medium of the present invention noted above encompasses a phase-change medium such as a rewritable optical disk, typical example of the recording medium of the present invention is a magnetic recording medium, and the present invention enables high-density magnetic recording by using the thermal assist technology such that recording of magnetic information is made in the part of the recording medium irradiated with light by the optical irradiation mechanism. In the case of the phase change recording medium, on the other hand, recording of information is made solely by optical irradiation.

Preferably, the optical injection unit 4 injects the optical beam into the recording head 2 with a predetermined incident angle, typically with a perpendicular angle, such that the optical irradiation mechanism provided in the recording head 2 can incorporate the light efficiently.

Further, it is preferable that the optical injection unit 4 includes an aberration generation part 5 that causes aberration in the optical beam to be injected and it is further preferable that the head retraction mechanism 6 includes a gap 7 for allowing the optical beam reflected by the aberration generation part 5 to be irradiated to the recording head 2 after passing through the head retraction mechanism 6. With this, the optical injection unit 4 can inject the optical beam into the recording head 2 constantly and stably even in the case the swing arm 1 is driven to cause a swinging motion.

Typically, the aberration generation part 5 comprises a pillar shaped mirror formed with a concaved surface having a curvature in the plane parallel to the surface of the recording medium, wherein the pillar shaped mirror typically carries a multilayer dielectric film on the concaved surface as a mirror film. By using such a pillar shaped mirror, it becomes possible to avoid the problem of transmittance of light, which tends to become a problem when a lens or the like is used.

Further, it should be noted that the aberration generation part 5 may be formed to have plural curvature surfaces in the thickness direction of the recording medium with a number equal to the number of upper and lower surfaces of platters constituting the recording medium. Thereby, all the plural curvature surfaces are formed to have the same curvature. With this, it becomes possible to irradiate the laser beam to plural platters at the same time.

Further, it is preferable that the aberration generation part 5 is formed of the material identical to the material forming the optical injection and head-retraction mechanism 3. For example, the aberration generation part 5 may be formed by a liquid crystal polymer by using a unitary molding process. Thereby, it becomes possible to lower the cost of the optical injection and arm-retraction mechanism 3.

Preferably, a transmission lens is provided to the aberration generation part 5 in the form unitary with the optical injection and head-retraction mechanism 3.

Thus, the information recording apparatus of the present invention has the feature of constructing the optical injection unit and the head retracting mechanism by a unitary molding process by using a liquid crystal polymer, or the like, wherein the optical injection unit includes therein an aberration generation means that causes injection of the laser beam produced by a laser diode for thermal assisting to the lateral surface of the magnetic head provided at the tip end part of the swing arm with a predetermined incident angle, typically with a perpendicular angle.

FIRST EMBODIMENT

Hereinafter, a magnetic disk apparatus 10 according to a first embodiment of the present invention will be described with reference to FIGS. 2-4.

Figure 2:
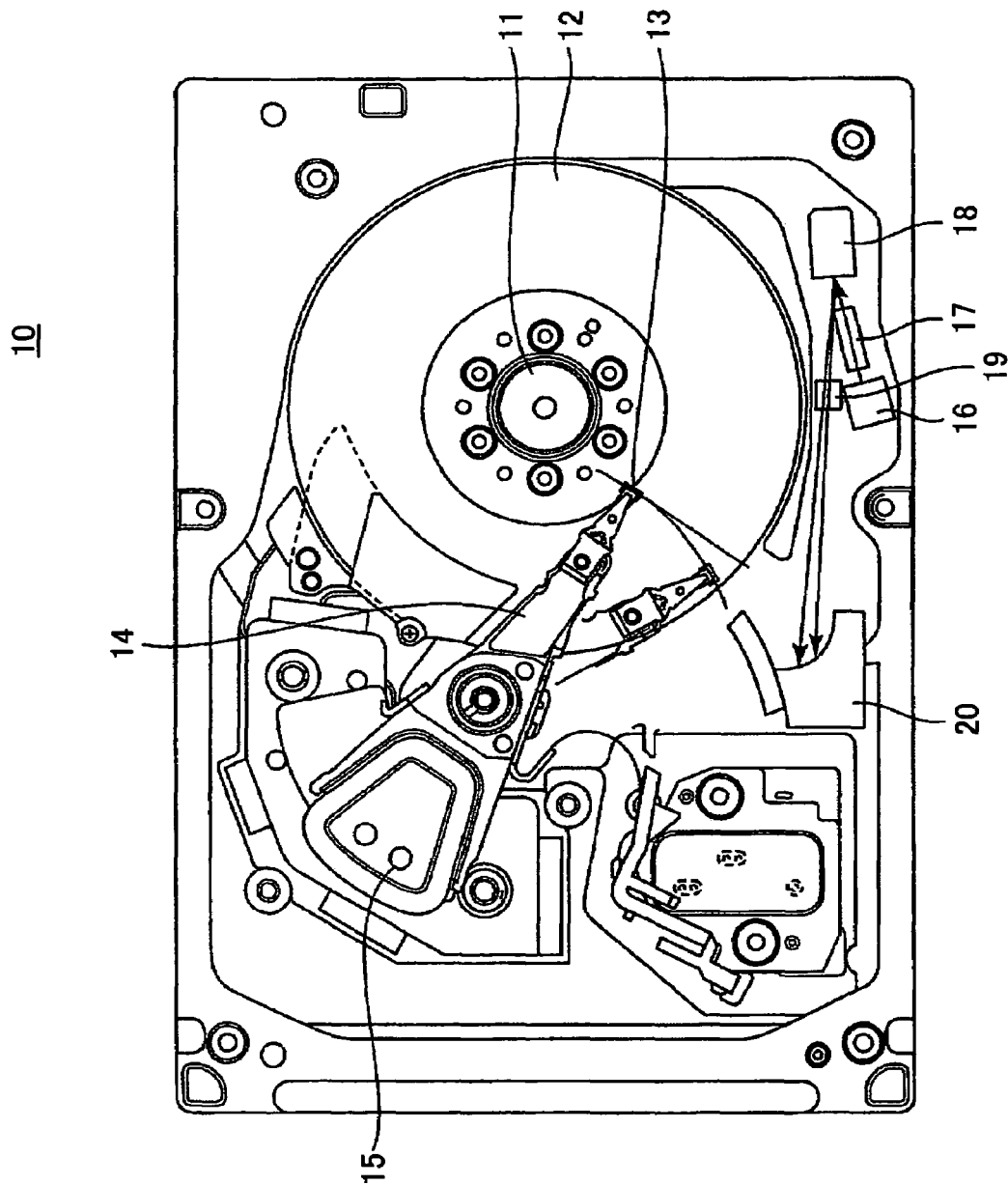
FIG. 2 is a schematic plan view diagram of the magnetic disk apparatus according to a first embodiment of the present invention.

Referring to FIG. 2 showing the magnetic disk apparatus 10 in a plan view, the magnetic disk apparatus 10 comprises a magnetic disk 12 fixed rotatably to a spindle motor 11 and a swing arm 14, wherein the swing arm 14 supports a slider 13 carrying thereon a magnetic head, and the swing arm 14 is driven by an electromagnetic actuator 15 for causing a swinging motion. The slider 13 has a construction identical with the slider for thermal assist technology proposed by the inventor of the present invention and explained with reference to FIG. 9.

Further, the magnetic disk apparatus includes, in a body of the apparatus, a laser diode 16, a focusing lens 17, an MEMS mirror 18, a cylindrical lens 19 and a ramp structure 20 that integrates therein an optical reflection structure in the form of a unitary body, wherein the laser beam from the laser diode 16 is focused upon the mirror surface of the MEMS mirror 18 by the focusing lens 17. Thereby, the laser beam reflected by the mirror surface is converted to a parallel beam in one direction (direction perpendicular to the plane of drawing) by the cylindrical lens 19 and is directed to the optical reflection structure integrated with the ramp structure 20. Thereby, the incoming laser beam is reflected by the optical reflection structure and is injected into an optical injection port similar to the port 60A provided at a lateral surface of the slider 13.

Figure 3:
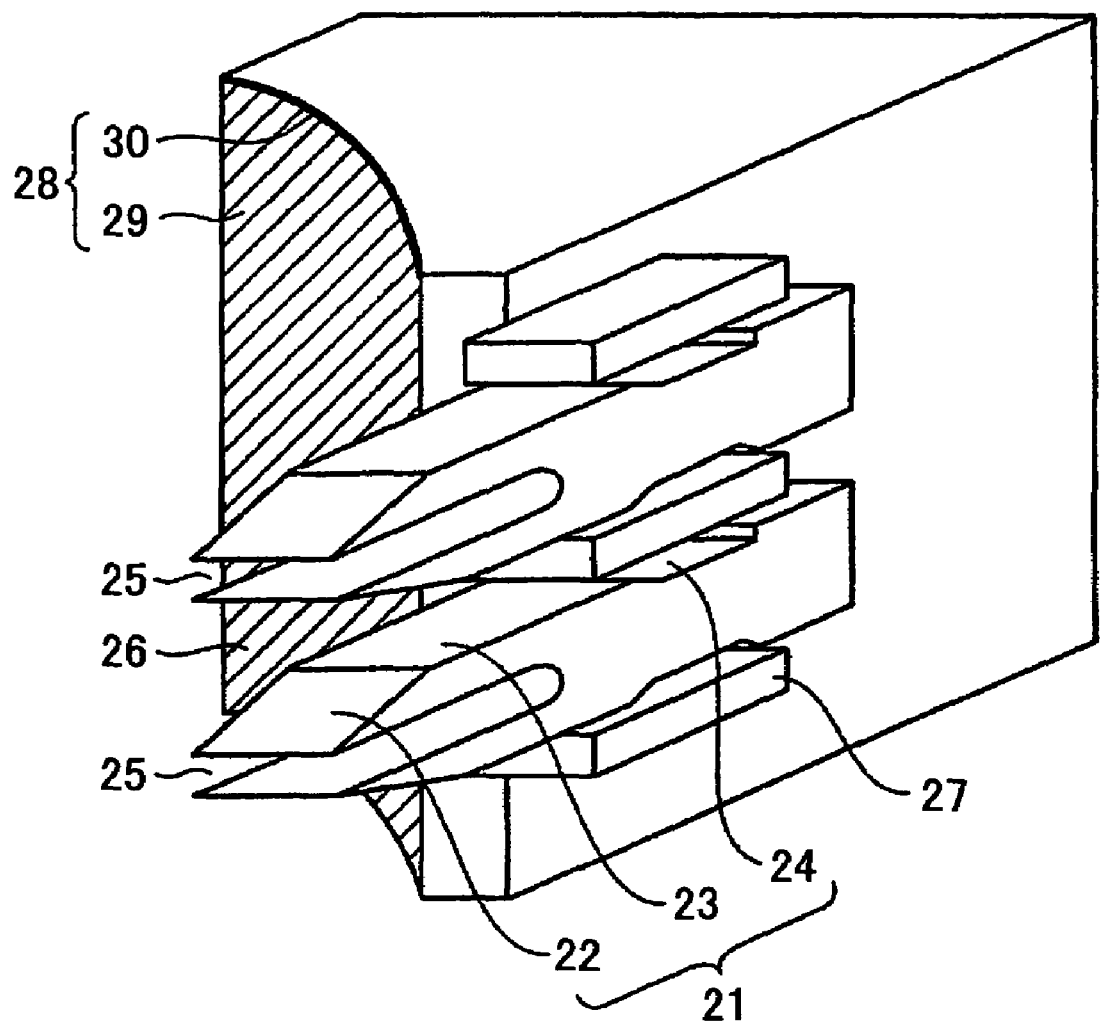
FIG. 3 is a schematic diagram showing the ramp structure used with the magnetic disk apparatus of the first embodiment.

FIG. 3 shows the ramp structure 20 provided to the magnetic disk apparatus of the first embodiment schematically.

Referring to FIG. 3, the ramp structure 20 is formed of a molded unitary body of liquid crystal polymer and comprises a ramp part and a reflection part 28, wherein the ramp part includes a first holding member 21 including in turn a sloped surface 22, a flat surface 23 and a depression part 24, and a second holding member 27, while the reflection part 28 has a cylindrical concaved surface 29 carrying a reflection film 30 of a multilayer dielectric film.

It should be noted that the cylindrical concaved surface 29 has a shape determined so as to cause diffusion of the laser beam in various directions by causing spherical aberration similarly to the spherical aberration lens noted before and enables injection of the laser beam perpendicularly to the optical injection port at the lateral surface of the slider 13 in each rotational angle of the swing arm 14.

Figure 4:
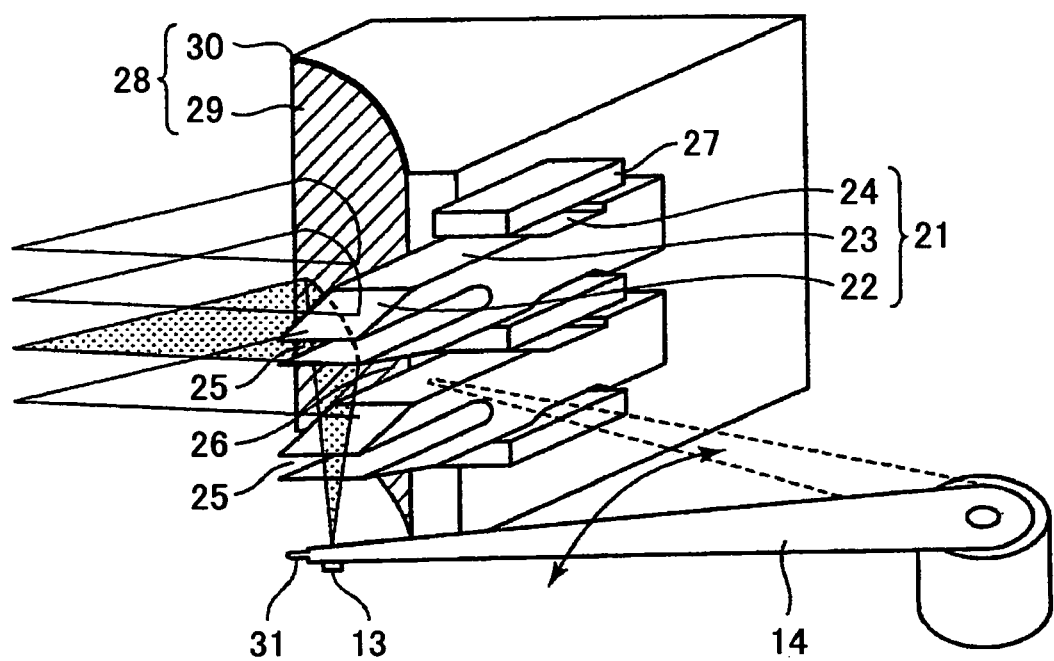
FIG. 4 is a diagram explaining the function of the ramp structure in the magnetic disk apparatus of the first embodiment.

FIG. 4 explains the function of the ramp structure 20 in the magnetic disk apparatus 10.

Referring to FIG. 4, the ramp structure 20 functions similarly to the conventional ramp mechanism and holds a tab 31 at the tip end part of the swing arm 14 as it is settled in the depression 24 after being guided along the sloped surface 22 and the flat surface 23 and held therein by the holding member 27. With this, it becomes possible to achieve excellent reliability for the magnetic disk apparatus similarly to the conventional magnetic disk apparatus.

On the other hand, the optical reflection mechanism functions to reflect the laser beam converted to the parallel beam in terms of the direction perpendicular to the plane of the drawing by the cylindrical lens 19 at the reflection film 30 on the surface of the cylindrical concaved surface 29 wherein the laser beam thus reflected is directed to the slider 13 through an optical beam passage 25 provided at the tip end part of the first holding member 21 or through a gap 26 between the first holding members 21 adjacent with each other.

The laser beam thus directed to the lateral surface of the slider 13 is then directed to the optical irradiation member of the $SiO_2/Ta_2O_5/SiO_2$ structure via a reflection mirror member similarly to the mirror member 65 formed by processing a bulk glass body in the form of prism, wherein the optical irradiation member directs the laser beam injected thereto to the magnetic disk 12 from the optical irradiation port provided at the tip end part of the optical irradiation member. With this, the magnetic disk 12 is heated locally and magnetic recording is achieved successfully by lowering the coercive force locally and temperately in the part where the recording is to be made.

Thus, according to the present invention, it becomes possible to irradiate a minute optical beam easily and uniformly via the slider 13 in a compact construction of the magnetic disk apparatus, by integrating the optical element that produces the desired spherical aberration to the light from the laser diode and the ramp structure for retracting the magnetic head in the unload state of the magnetic disk apparatus. It should be noted that such an optical system integrated with the ramp structure can be produced with low cost by using the molding technology.

Further, with the present invention that induces the desired spherical aberration by using a reflection surface, there arises no problem of optical absorption contrary to the case of using a spherical aberration lens. Further, because the laser beam directed to the slider 13 is passed through the optical passage 25 provided to the ramp structure 10 or through the gap 26, there arises no problem that the laser beam is blocked by the first holding member 21.

Thus, with the magnetic disk apparatus 10 of the first embodiment, in which the laser diode 16 is disposed at a location other than the location of the swing arm 14 for conducting the thermal assist operation, it becomes possible to perform high-speed writing and reading operation of information without sacrificing the advantageous feature of magnetic disk apparatus by causing the swing arm 14 to perform high-speed seek operation, even in the case the magnetic disk apparatus 10 is a compact magnetic disk apparatus designed for mobile applications or the like.

SECOND EMBODIMENT

Next, a magnetic disk apparatus according to a second embodiment of the present invention will be described with reference to FIG. 5 wherein those parts corresponding to the parts described previously are designated by the same reference numerals and description thereof will be omitted. Because the present embodiment is identical to the embodiment described before except for the ramp structure, the description will be made hereinafter only for the ramp structure.

Figure 5:
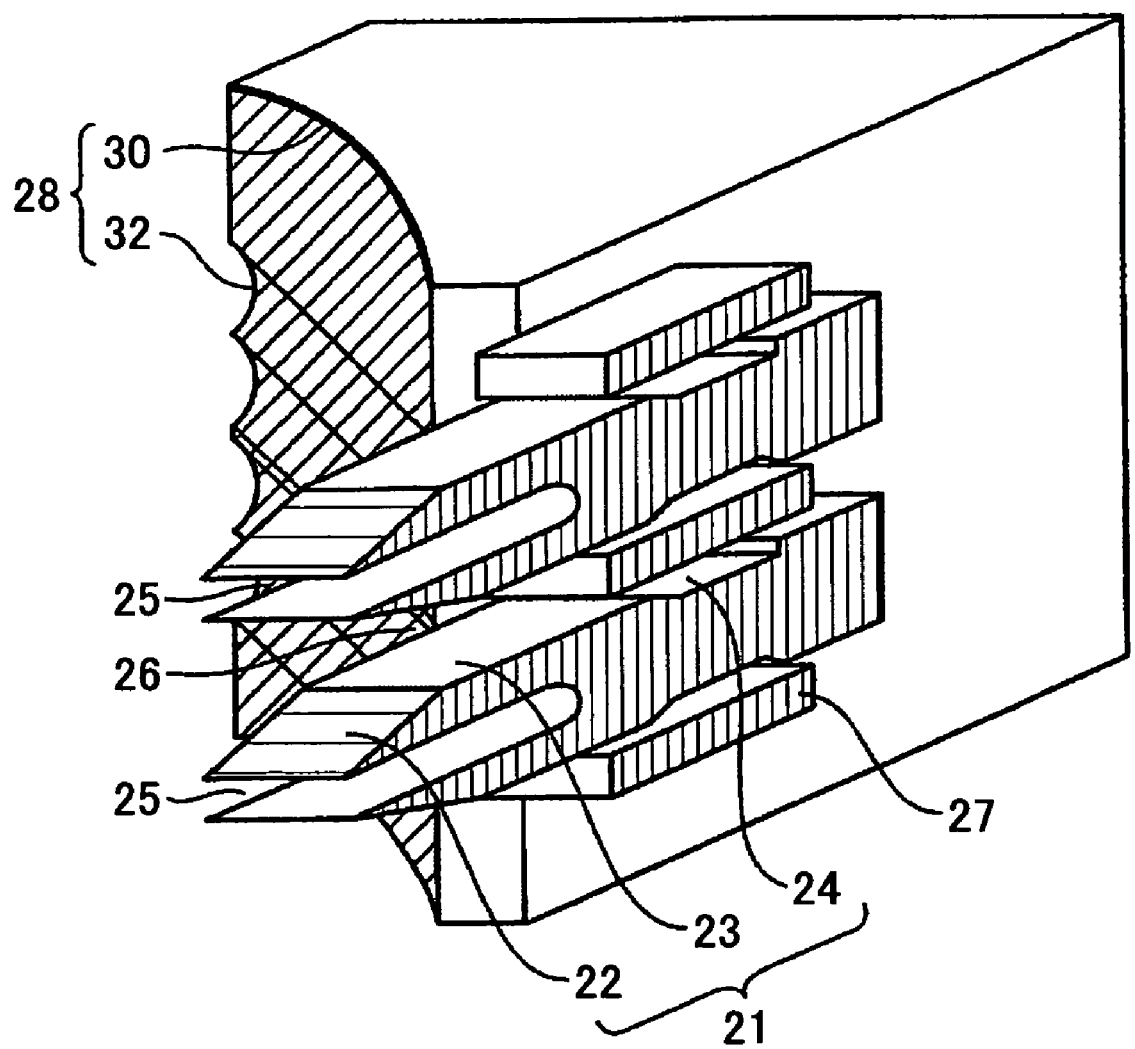
FIG. 5 is a schematic diagram showing the construction of a ramp structure used in a magnetic disk apparatus according to a second embodiment of the present invention.

FIG. 5 is a diagram showing a ramp structure 20A used with the magnetic disk apparatus according to the second embodiment of the present invention.

Referring to FIG. 5, the ramp structure 20A has the reflection surface for causing spherical aberration such that the reflection surface is formed of plural reflection surfaces 32 provided with a number identical to the number of the sliders 13 and with a common, identical curvature.

Figure 9:
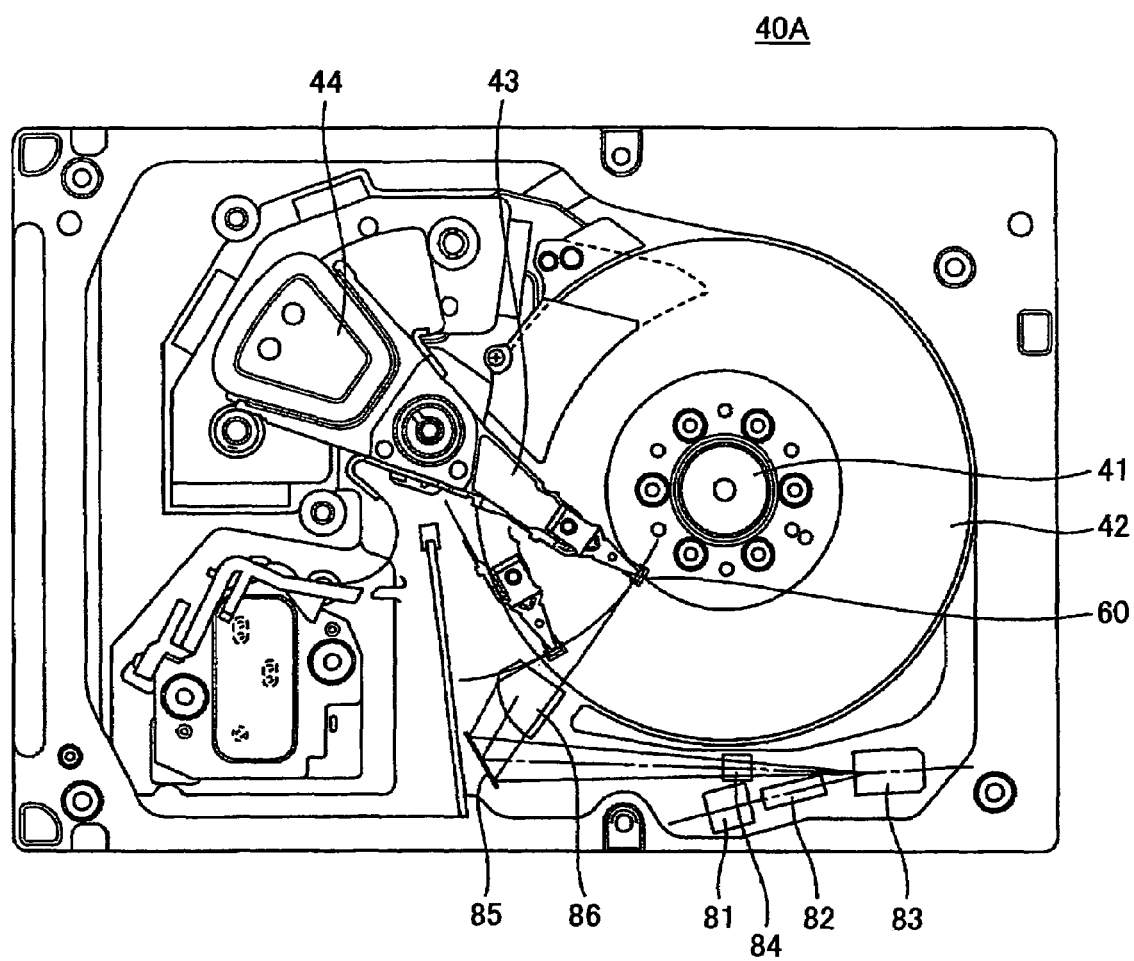
FIG. 9 is a schematic plan view diagram showing the construction of a magnetic disk apparatus according to another related art proposed by the inventor of the present invention.
Figure 10:
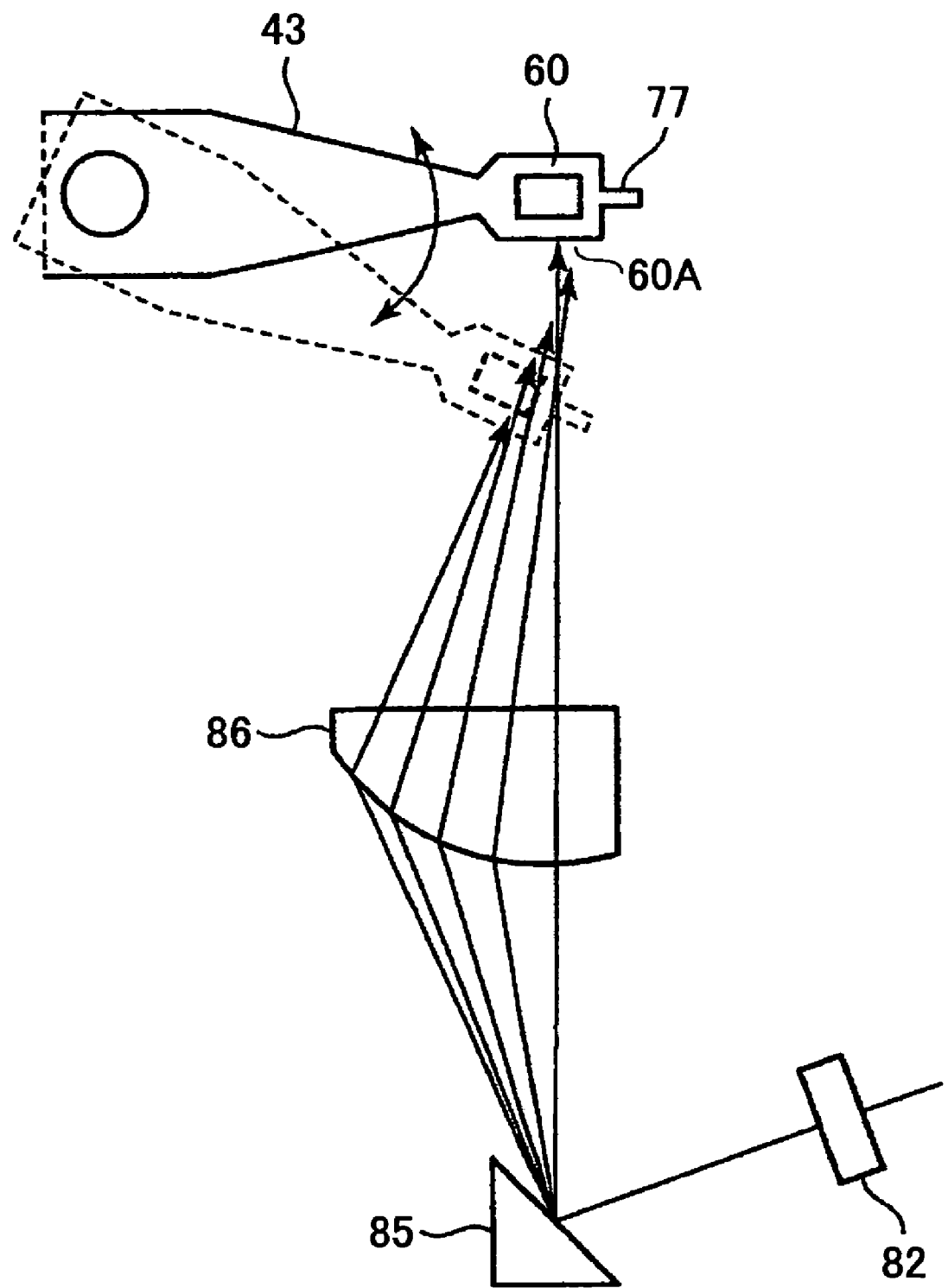
FIG. 10 is a diagram explaining optical irradiation of a laser beam to a lateral surface of a slider in the magnetic disk apparatus of FIG. 9.
Figure 12B:
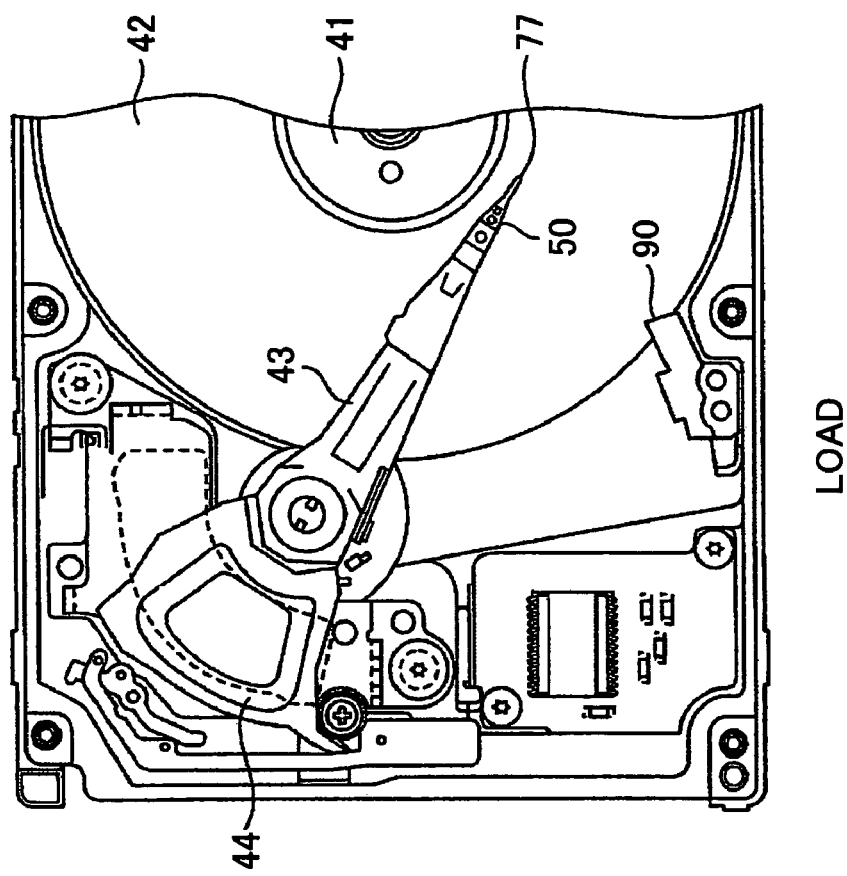
FIGS. 12A and 12B are diagrams explaining the state of a head suspension of a compact magnetic disk apparatus respectively in an unload state and a load state.
Figure 12A:
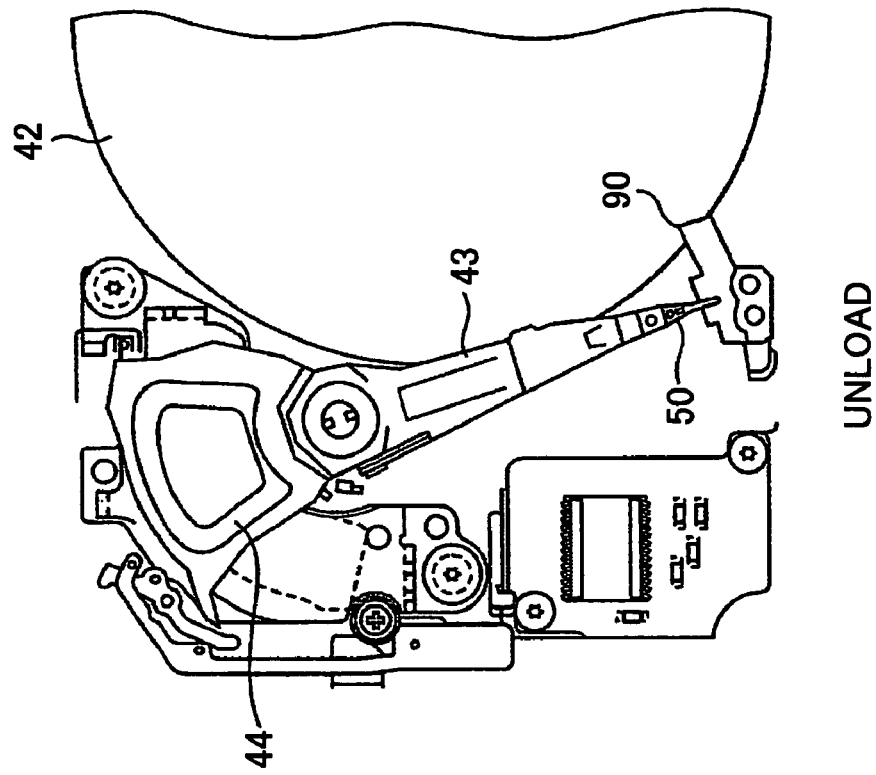
Figure 13:
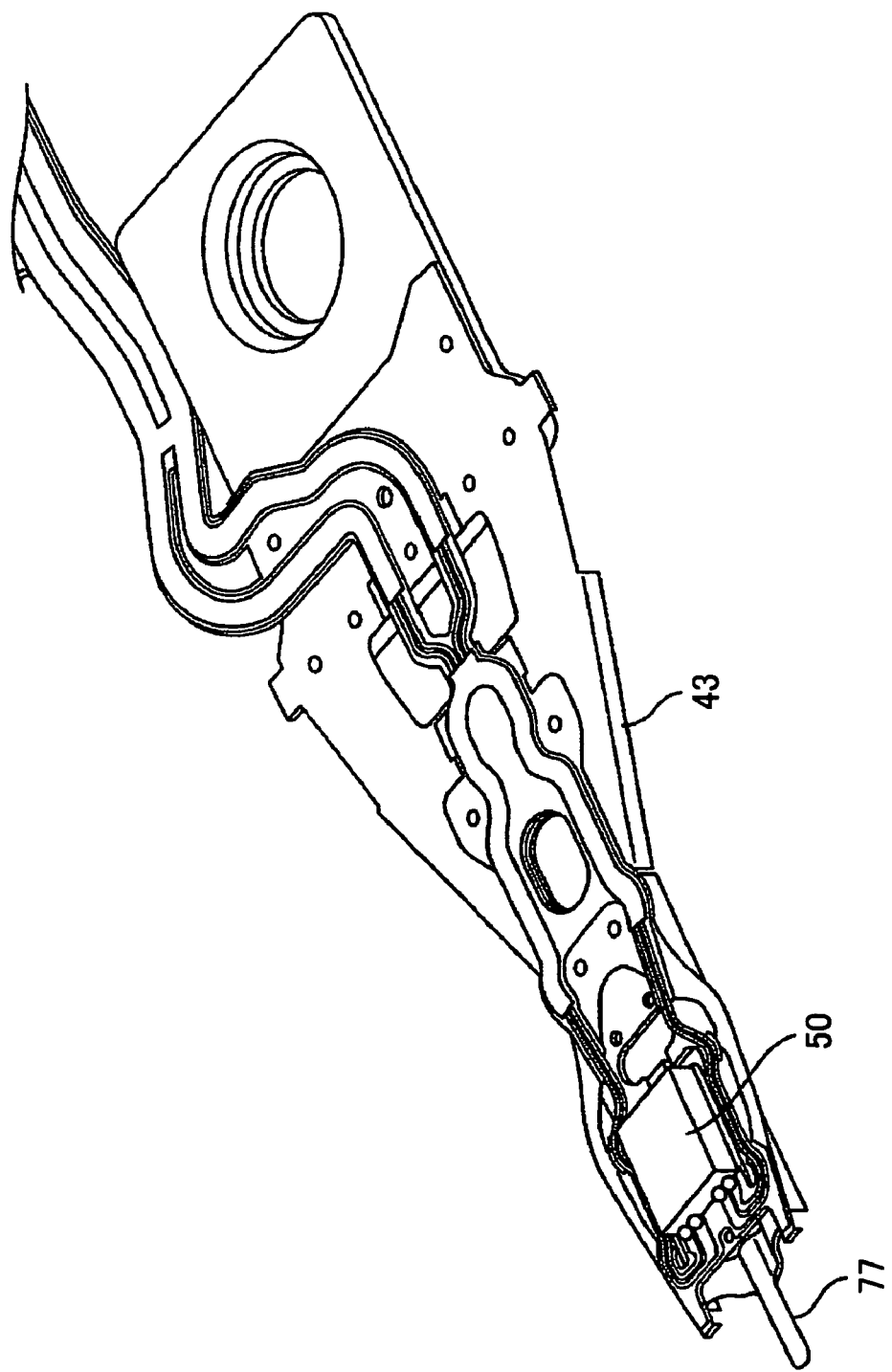
FIG. 13 is an oblique view diagram showing the head suspension used with the compact magnetic disk apparatus of FIG. 9.
Figure 14:
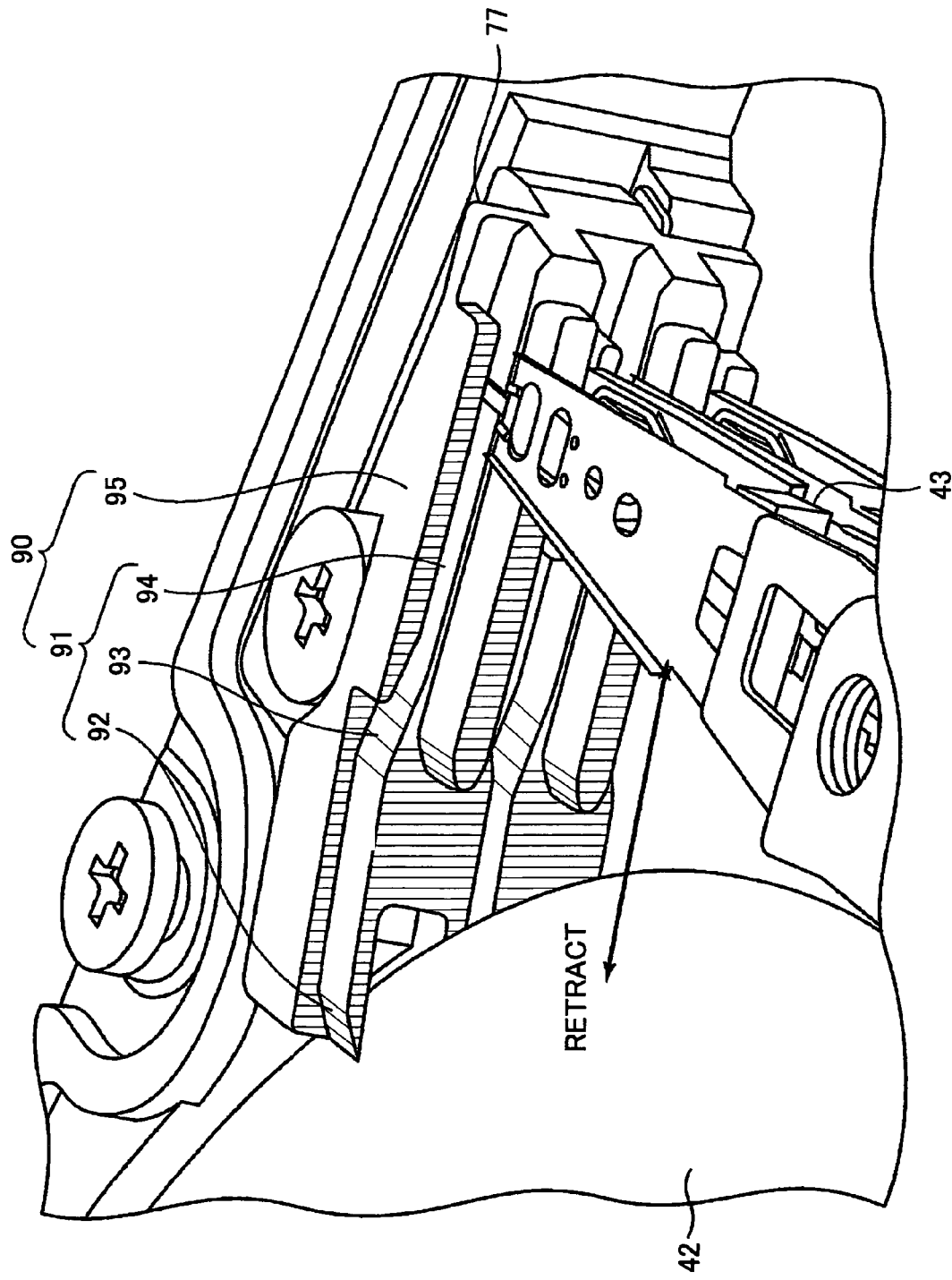
FIG. 14 is a diagram explaining the state of retracting the head suspension to the ramp structure with the compact magnetic disk apparatus of FIG. 9.

Thus, by using plural reflection surfaces 32 provided in number identical with the number of the sliders 13, and by providing the same curvature to each of the plural reflection surfaces 32, it becomes possible to irradiate the laser beam to the plural splatters simultaneously, similarly to the magnetic disk apparatus of FIG. 9 explained before.

THIRD EMBODIMENT

Next, a magnetic disk apparatus according to a second embodiment of the present invention will be described with reference to FIG. 6 wherein those parts corresponding to the parts described previously are designated by the same reference numerals and description thereof will be omitted. Because the present embodiment is identical to the embodiment described before except for the ramp structure, the description will be made hereinafter only for the ramp structure.

Figure 6:
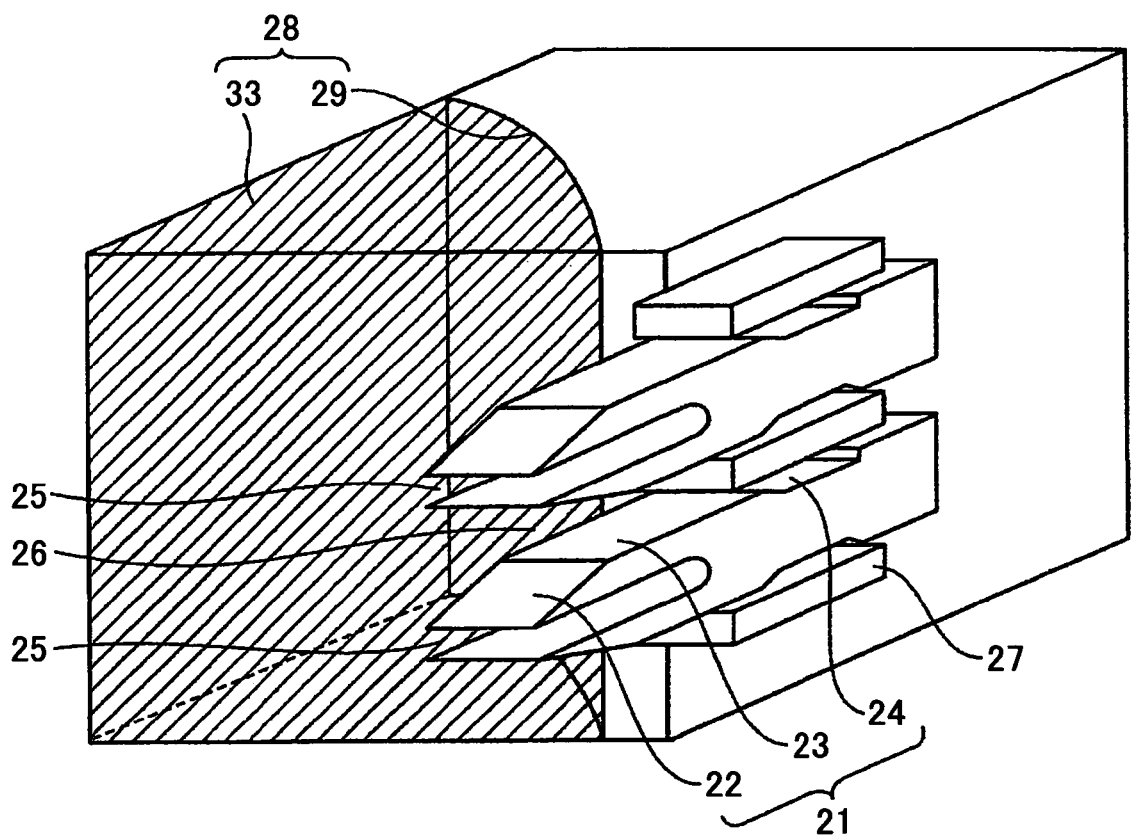
FIG. 6 is a schematic diagram showing the construction of a ramp structure used in a magnetic disk apparatus according to a third embodiment of the present invention.
Figure 7:
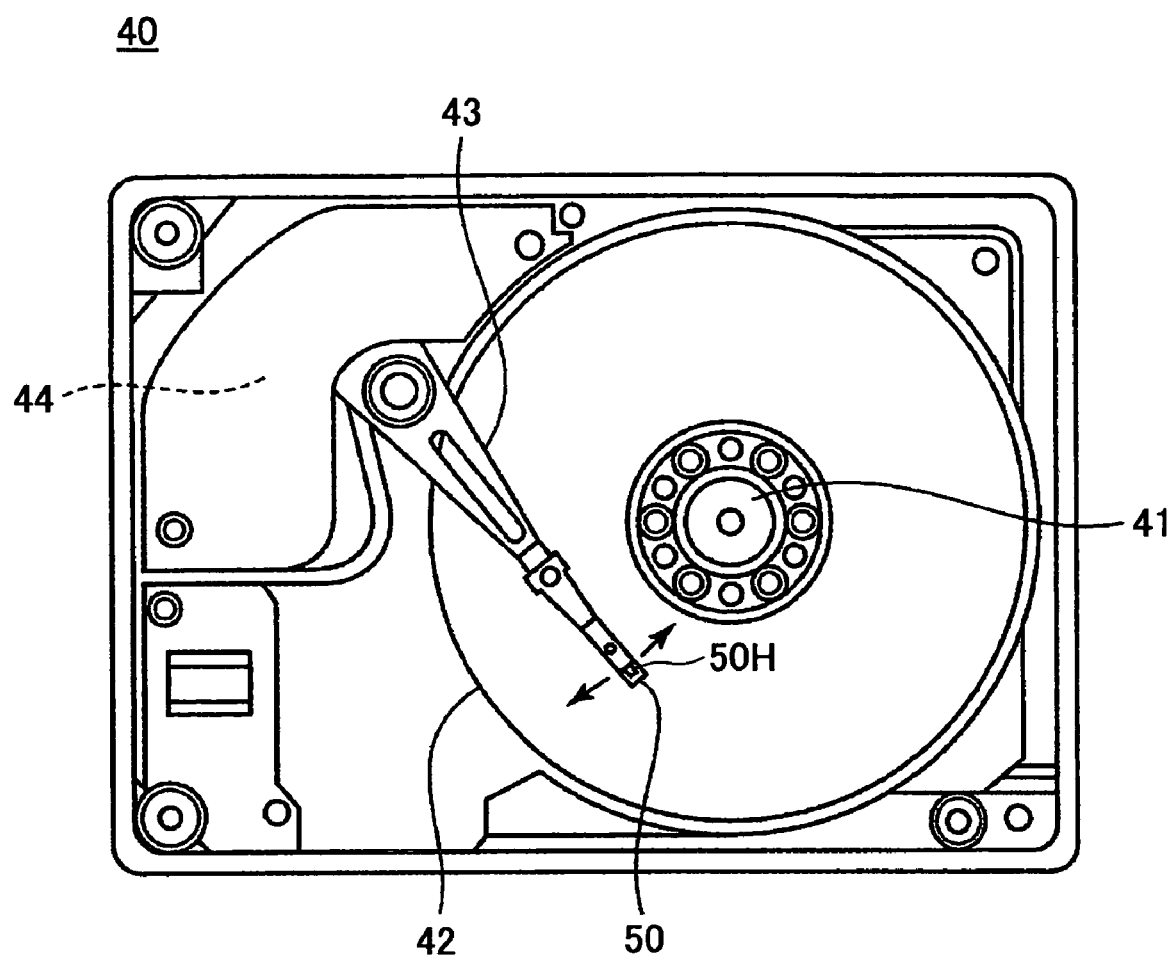
FIG. 7 is a schematic plan view diagram showing the construction of a magnetic disk apparatus according to a related art of the present invention.
Figure 8:
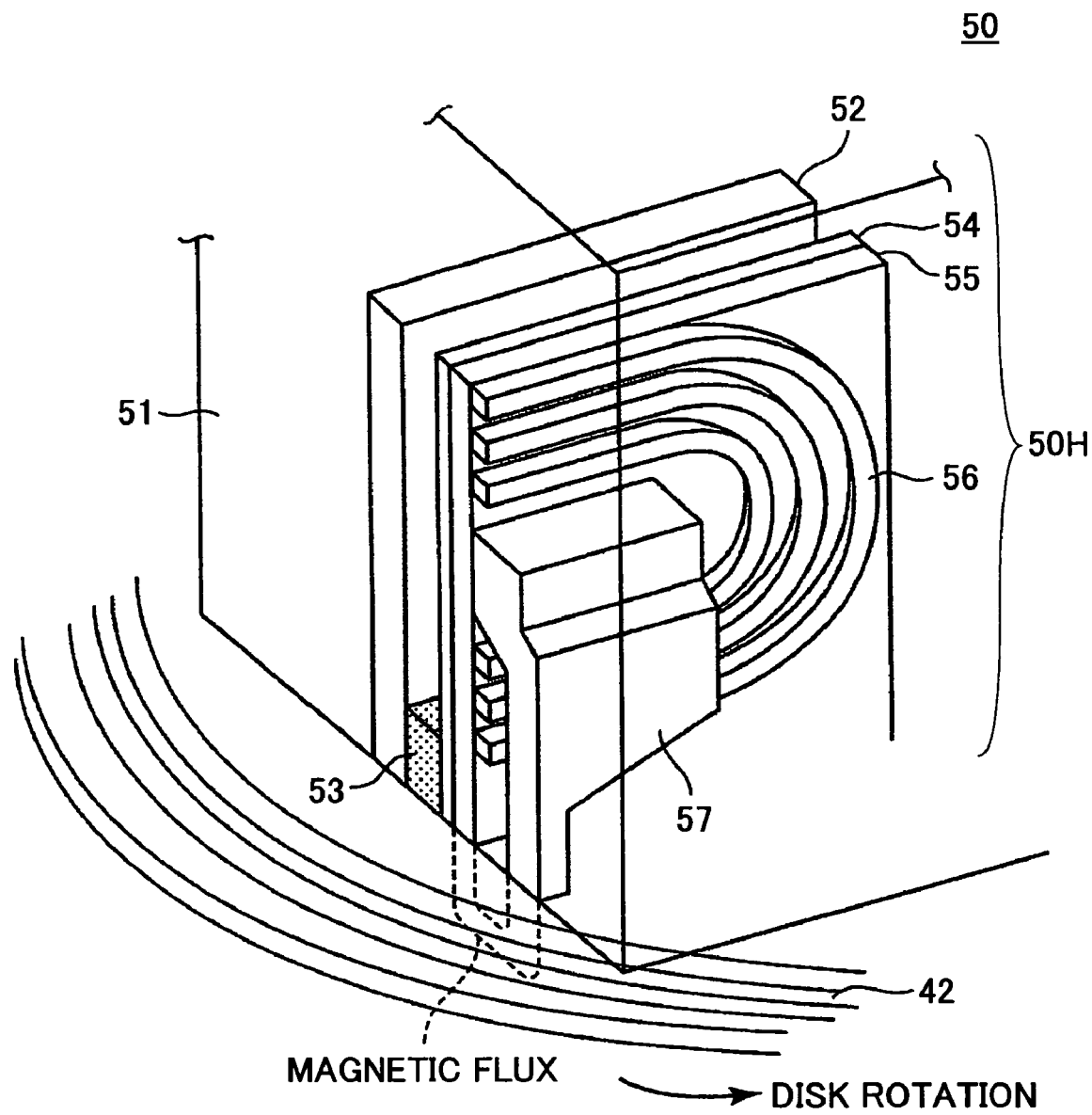
FIG. 8 is a schematic oblique view diagram showing a slider used in the magnetic disk apparatus of FIG. 7.

FIG. 6 is a diagram showing a ramp structure 20B used with the magnetic disk apparatus according to the third embodiment of the present invention.

Referring to FIG. 6, the ramp structure 20B has a construction of bonding a transparent spherical aberration lens 33 on the reflection surface of the ramp structure 20. Preferably, the spherical aberration lens 33 is formed by molding a glass or plastic, wherein the lens 33 thus molded is attached to the reflection surface by way of an adhesive, or the like.

While the present invention has been explained for preferred embodiments, the present invention is by no means limited to such a specific example and various variations and modifications may be made without departing from the scope of the invention.

For example, while the embodiments described heretofore switches the optical path of the optical beam between plural platters by using the MEMS mirror 18, the switching element is not limited to an MEMS mirror and it is also possible to use a movable mirror such as a galvanometric mirror.

Further, in the event it is desired to increase the amount of the optical beam injected to the slider 13, it is possible to rotate the MEMS mirror such that the laser beam is scanned in the X-direction or Y-direction.

Further, while the magnetic head of the first embodiment has a construction of disposing the reading head a the left side of the reflection mirror 65 (a side closer to the AlTiC substrate 61), such a construction is not essential to the present invention and it is also possible to dispose the reading head at the right side of the writing head.

Further, while the foregoing embodiments has been explained for the case of using a monopole head for the writing head, the present invention is by no means limited to a monopole head and it is also possible to use an in-plane recording head.

While the present invention is typically applied to magnetic disk apparatuses, the present invention is also effective in other information recording apparatuses such as an optical disk apparatus of phase change type.

What is claimed is:

1. An information recording apparatus comprising:
a recording medium;
a swing arm driven by an actuation unit, said swing arm swinging over a surface of said recording medium in response to driving by said actuation unit;
a recording head carried by said swing arm and scanning over said surface of said recording medium with a swinging motion of said swing arm by said actuation unit, said recording head recording information to said recording medium;
a head retracting mechanism retracting said recording head out of said recording medium in an unload state where no recording is to be made on said recording medium;

an optical injection unit injecting a light into said recording head, said recording head including an optical irradiation part irradiating said light injected to said recording head upon said recording medium when recording information to said recording medium, wherein said optical injection unit is integrated with said head retracting mechanism to form a unitary optical-injection and head-retraction mechanism, said optical injection unit having a ramp surface with a predetermined curvature, said light being reflected and focused on said recording head by said ramp surface of said optical injection unit, said head retracting mechanism including a sloped surface for engaging with said swing arm when said recording head is retracted out of said recording medium.

2. The information recording apparatus as claimed in claim 1, wherein said recording medium comprises a magnetic recording medium, and wherein said information recording apparatus records information magnetically to a part of said magnetic recording medium irradiated with said light by said optical irradiation part of said recording head.

3. The information recording apparatus as claimed in claim 1, wherein said recording medium comprises a phase change recording medium and wherein said recording medium is recorded with information by said optical irradiation part of said recording head.

4. The information recording apparatus as claimed in claim 1, wherein said optical injection unit injects said light to said recording head with a predetermined incident angle.

5. The information recording apparatus as claimed in claim 1, wherein said optical injection unit includes an aberration generation part, and wherein said head retraction mechanism includes a gap allowing passage of said light after being reflected by said aberration generation part.

6. The information recording apparatus as claimed in claim 1, wherein said aberration generation part having a curvature in a plane parallel to said surface of said recording medium, said aberration generation part forming an aberration in said unitary optical-injection and head-retraction mechanism.

7. The information recording apparatus as claimed in claim 5, wherein said aberration generation part generates a spherical aberration.

8. The information recording apparatus as claimed in claim 5, wherein said aberration generation part includes plural curvature surfaces in a thickness direction of a medium constituting said unitary optical-injection and head-retraction mechanism with a number identical to a number of an upper surface and a lower surface of platters constituting said recording medium, said plural curvature surfaces having an identical curvature in a plane parallel to said surface of said recording medium.

9. The information recording apparatus as claimed in claim 5, wherein said aberration generation part is formed as a unitary body with said unitary optical-injection and head-retraction mechanism with a material identical to a material forming said unitary optical-injection and head-retraction mechanism.

10. The information recording apparatus as claimed in claim 1, wherein said aberration generation part further includes a transmission lens, wherein said transmission lens is provided as a unitary body to said unitary optical-injection and head-retraction mechanism.

11. The information recording apparatus as claimed in claim 1, wherein said head retracting mechanism includes a gap providing a path of said light from said ramp surface to said recording head.

* * * * *